United States Patent [19]

Spring, Sr.

[11] 4,016,940

[45] Apr. 12, 1977

[54] PNEUMATIC NUT RUNNER HAVING A DIRECTIONAL VALVE AND AN AIR REGULATOR

[75] Inventor: Edward F. Spring, Sr., Mohawk, N.Y.

[73] Assignee: Chicago Pneumatic Tool Company, New York, N.Y.

[22] Filed: Oct. 21, 1975

[21] Appl. No.: 624,483

[52] U.S. Cl. .......................... 173/169; 137/625.21; 137/599.2

[51] Int. Cl.$^2$ .............................. B23B 45/04; E03B

[58] Field of Search .................... 173/163, 169, 12; 137/625.21, 625.22, 599

[56] References Cited

UNITED STATES PATENTS

| | | | |
|---|---|---|---|
| 2,695,036 | 11/1954 | Kronheim | 137/625.21 |
| 3,093,360 | 6/1963 | Krouse | 173/163 X |
| 3,146,795 | 9/1964 | Retallick | 137/625.23 X |
| 3,354,732 | 11/1967 | Wickham | 173/169 X |
| 3,515,225 | 6/1970 | States | 173/12 |
| 3,696,834 | 10/1972 | Vahoff, Jr. | 173/163 X |
| 3,833,068 | 9/1974 | Hall | 173/163 X |
| 3,927,690 | 12/1975 | Agren | 137/599.2 |

*Primary Examiner*—Ernest R. Purser
*Assistant Examiner*—Richard E. Favreau
*Attorney, Agent, or Firm*—Stephen J. Rudy

[57] ABSTRACT

A nut running pneumatically powered tool, such as an impact wrench, having in a handle portion a group of valves including a throttle valve for admitting air to the tool, a manually adjustable directional valve for selectively directing the air to either a forward or reverse side of an air motor, and a regulating unit located between the directional valve and the throttle valve manually adjustable independently of the directional valve for regulating the volume air flow from the throttle valve to the directional valve.

14 Claims, 7 Drawing Figures

PNEUMATIC NUT RUNNER HAVING A DIRECTIONAL VALVE AND AN AIR REGULATOR

BACKGROUND OF THE INVENTION

This invention is concerned with providing a pneumatically powered reversible impact wrench with improved manually operable torque selector mechanism which enables the operator to adjust and select the torque output value of the tool that may be needed in accordance with the work involved and the intended torquing direction.

A tool of this improved nature is especially desired in auto service stations in applying and removing bolts and nuts, some applications requiring transmission of full torque in a forward or reverse direction, and other applications requiring only limited torque in one direction or the other.

Accordingly, a general object of the invention is to provide a pneumatically powered reversible impact wrench with manually operable directional torque and torque value control means which enables the operator to select not only the direction of torque output but also to regulate the value of the output in either a forward or reverse direction.

Another object is to associate at a convenient location, as in the handle of the tool, an air flow regulating unit with a directional flow control valve in such manner that each is manually adjustable independently of the other and the adjustment of one does not interfere with adjustment of the other.

A further object is to provide in association with a flow by-pass valve a flow regulating valve which is manually selectively adjustable to cause restricted air flow through the by-pass valve, or to cause without further adjustment of the regulating valve full air flow through the by-pass valve following a relative adjustment of the latter.

A feature of the invention is a combined flow by-pass valve and flow regulator valve in association with a directional valve whereby the foregoing objectives are accomplished.

In accordance with the invention there is provided a pneumatically powered nut running tool comprising in a housing, a reversible rotary air motor for providing a forward or reverse torque output accordingly as live air is applied to a forward or reverse side of the motor; a throttle valve for admitting live air into the housing; a directional valve selectively manipulative for controlling the directional application of the live air to the motor, and a manually operable flow regulating unit positioned between the directional valve and the throttle valve for regulating the volume flow of the live air from the throttle valve to the directional valve, the regulating unit comprising a manipulative by-pass valve in sleeved relation to a separately manipulative regulating valve each being selectively adjustable relative to the other for determining either a full or a restricted volume air flow to the directional valve.

DESCRIPTION OF PREFERRED EMBODIMENT

Figures 1, 2, 3, 4, 5, 6, 7:
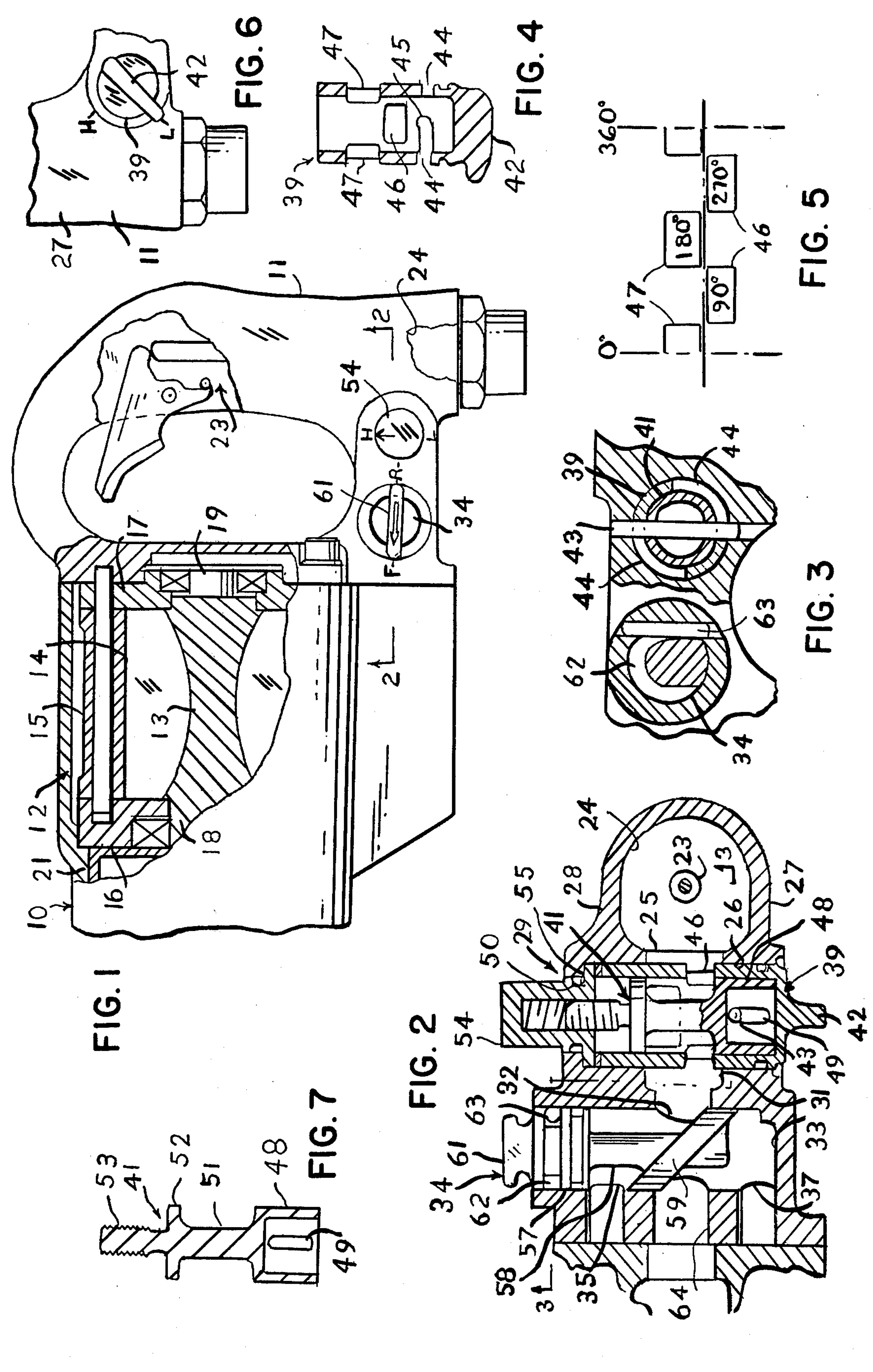
FIG. 1 is a side elevation view partly in section of a pneumatically powered reversible impact wrench to which the invention has been applied; only so much of the tool as is needed to describe the invention being shown.
FIG. 2 is a section taken on line 2—2 of FIG. 1.
FIG. 3 is a section taken on line 3—3 of FIG. 2.
FIG. 4 is a detail in longitudinal section of the by-pass valve.
FIG. 5 is a development view of the arrangement of the ports in the by-pass valve.
FIG. 6 is a fragmentary detail in side elevation of the right side of the handle of the tool.
FIG. 7 is a detail in longitudinal section of the directional valve.

The impact wrench shown in the drawing as illustrating the invention has a general housing 10 provided with a handle section 11, and having a main body section in which a motor assembly 12 of a conventional reversible rotary air driven vane type is supported.

The motor assembly includes the usual reversible rotor 13 which is rotatable in conventional manner in a chamber 14 in either a forward or reverse direction accordingly as live air is fed to either of the usual forward or reverse directional driving areas of the chamber. The motor chamber 14 is defined by a liner 15 having open ends which are closed by the usual pair of end plates 16, 17. The rotor has the usual shaft ends 18, 19 supported in bearings fitted in the end plates. The forward shaft end 18 is drivingly coupled with conventional nut driving and impacting mechanism, partially shown at 21, whereby a nut to which the usual socket end of the tool is applied may be set or loosened.

A throttle valve 23 in the handle is manually operable to cause admission of live air from an external source into an inlet passage 24 of the tool.

The inlet passage 24 connects through an inlet port 25 (FIG. 2) with a first bore 26 extending laterally of the handle and opening through opposite side faces 27 and 28 of the latter. In this bore an air flow regulating assembly or unit 29 is fitted. An outlet port 31 from bore 26 connects with a single inlet port 32 to a second laterally extending bore 33 in the handle. In the latter bore a reverse or flow control directional valve 34 is fitted. The latter bore 33 connects through a first outlet port 35 with a passage in the housing leading to a forward driving area of the motor chamber; and bore 33 also connects through a second outlet port 37 with another passage in the housing leading to a reverse driving area of the motor chamber.

The regulating unit 29 is effective to cause supply air admitted by the throttle valve to the inlet passage 24 to pass from the latter to the directional valve in full or restricted volume flow, accordingly as the regulating unit is manually adjusted. And the directional valve 34, accordingly as it is manually adjusted, causes the regulated air to pass either through the first outlet port 35 to drive the motor in a forward direction, or to pass through the second outlet port 37 to drive the motor in a reverse direction.

The regulating unit 29 is an assembly or combination (FIG. 2) of a flow by-pass valve 39 (FIG. 4) and a flow regulating valve 41 (FIG. 7).

The by-pass valve 39 is of cylindrical cup-form; and it is fitted into bore 26 for rotation or angular adjustment relative to the inlet and outlet ports 25, 31 of the bore. A closed end of the valve is exposed through an open end of the bore at the right side of the handle, as in FIGS. 2 and 6; and it is formed with an externally extending ear or finger-grip 42 whereby the valve may be manually adjusted rotatively in one direction or the other. A pin 43 fitted into the handle and extending through a pair of opposed circumferential slots 44 (FIGS. 3, 4, 2) in the side wall of the valve restrains the valve against relative axial movement. Each slot 44 extends circumferentially sufficiently, so that the pin is cooperable with the ends of the slots to limit the extent of angular adjustment of the valve to 90° in either direction. Suitable means, which may be a slight bay or dwell 45 at opposite ends of the slots is cooperable with the pin to retain the valve in its angularly adjusted position against the usual vibratory forces attending the operation of the tool. In lieu of the dwells at the ends of the slots, detent or other suitable means may be provided to releasably retain the valve in its angularly adjusted positions.

The side wall of the by-pass valve is formed with a first pair of opposed ports 46 (FIGS. 2, 4, 5); and with a rearwardly disposed second pair of similar opposed ports 47. The latter pair of ports is arranged or centered 90 ° out of phase from the first pair. The arrangement of the two pairs of ports is such that when the by-pass valve is turned 90 ° in one direction or the other, one pair of the ports will communicate the inlet port 25 with the outlet port 31 and the other pair of ports will be blocked off. Ports 25 and 31 are of sufficient lateral dimension to be registrable with one or the other pair of the ports 46, 47, accordingly as the by-pass valve is angularly adjusted.

The regulating valve 41 (FIGS. 2, 3, 7) is manually adjustable so as to regulate volume flow through the by-pass valve to the directional valve. It is of spool form; and is telescoped or slidably received into a rear open end of the by-pass valve. It includes a cylindrical forward land 48 that bears upon the surrounding wall of the by-pass valve. The retaining pin 43 also extends through a pair of opposed longitudinally extending slots 49 in the land 48, whereby the regulating valve is restrained against rotation relative to the by-pass valve but is allowed relative axial movement to the extent of the limits of the slots. A neck portion 51 of the valve joins the land 48 with a second cylindrical land 52 which also bears upon the surrounding wall of the by-pass valve. Extending axially from land 52 is a threaded stem 53 upon which a nut in the form of a manipulative knob 54 is threaded.

The knob projects externally of the left side face (FIGS. 1, 2) of the handle where it may be conveniently manually operated. A circular flange 55 at the inner end of the knob bears between an internal shoulder of the bore and a washer located at the rear end of the by-pass valve, whereby the knob is restrained against endwise escape.

The regulating valve 41 has an extended adjusted position, as in FIG. 2, relative to the by-pass valve, in which position it abuts the stop pin 43; and in which position both pairs of ports 46, 47 of the by-pass valve are exposed to the area about the neck 51 of the regulating valve. This position of the valve will be indicated externally of the tool (FIG. 1) by the arrow on the knob 54 pointing to the symbol H marked on the side of the handle.

When the knob 54 is angularly adjusted in a clockwise direction (FIGS. 1, 2) the regulating valve is retracted from this extended position into the knob. As the valve is retracted it draws its land 48 into progressively restricted or blocking relation to the first pair of ports 46 of the by-pass valve. The forward end of slot 49 cooperates with the stop pin 43 to limit the extent of retraction of the regulating valve so that only the first pair of ports 46 can be restrictively blocked. This restricted position of the valve will be indicated by the arrow on the knob pointing to the symbol L marked on the side of the handle. The knob is frictionally restrained in its adjusted position by means of an O-ring 50.

It can be seen from the structure and adjustable relationship of the regulating valve to the by-pass valve that, when the regulating valve obtains the extended position shown in FIG. 2 only full or high volume flow of inlet air will pass to the directional valve thrugh the pair of ports 46, or the pair 47, whether the by-pass valve is adjusted 90° in one direction or the other. But, when the regulating valve is adjustably retracted into the knob from the FIG. 2 position, a restricted flow of inlet air will pass through the first pair of ports 46, (when the by-pass valve is adjusted 90° in one direction to register its pointer with the L symbol at the right side of the handle); and also in this retracted position a full flow of inlet air will pass through the second pair of ports 47, (when the by-pass valve is adjusted 90° in the opposite direction to register its pointer with the H symbol at the right side of the handle).

The reverse or directional valve 34 is structured for operation to direct, as may be selected, flow of inlet air from the regulating unit 29 to either the forward or reverse driving areas of the motor. To this end, the valve is of spool form and manually operable. It has a rear land portion 57 which bears upon the surrounding wall of the bore 33; and it has a neck portion 58 of reduced diameter which connects land 57 with a disc land portion 59. The disc has an angular or skewed relation to the neck; and it also bears upon the surrounding wall of bore 33. An ear on finger grip 61 projects from land 57 externally of the left side of the handle where it is manipulative to adjust the valve rotatively in one direction or the other. Land 57 is formed with a peripheral groove 62 of U-form (FIG. 3) through which a stop pin 63 extends. The opposed straight sides or legs of groove 62 are cooperable with the pin to limit angular adjustment of the valve to 180° in either direction. Pin 63 also serves to retain the valve against axial movement relative to the handle.

When the directional valve is angularly adjusted in one direction, the skewed disc obtains a position, as in FIG. 2, in which air leaving the flow regulating unit 29 is directed through port 35 to the forward side of the motor; and when the valve is adjusted in the opposite direction, the disc obtains a position directing the air from the regulating unit through port 37 to the reverse side of the motor. An external pointer (FIG. 1) on the finger grip 61 of the directional valve is registrable with an F or R symbol marked on the side of the handle to indicate the adjusted position of the valve as being for forward or reverse application of air to the motor. In either of the adjusted positions of the directional valve one or the other of the outlet ports 35, 37, blocked off by the disc from the regulating unit and accordingly not passing air to the motor, is connected to a common exhaust port 64.

In using the air flow control arrangement for operation of the tool let it be assumed that the regulating valve 41 is in its extended adjusted position as in FIG. 2. In this position air flow to the directional valve will be in full volume, whether the associated by-pass valve 39 is adjusted to register the first or the second pair of ports 46 or 47, with the inlet port 25. This full volume flow will pass to the forward side of the motor when the directional valve obtains its F position as in FIGS. 1, 2; and it will pass to the reverse side of the motor when the directional valve is adjusted to its opposite or R position. It can be seen that in the extended condition of the regulating valve element, as in FIG. 2, it is required to adjust only the directional valve to pass a full volume flow in the selected direction. Usually, the operator will leave the regulating valve in its extended condition when the application of the tool will be used substantially for full volume flow.

But, when a project requires repeated back and forth change over from full to restricted flow, the work of the operator is simplified by adjusting the regulating valve member to its restricted or L position. When the regulating valve is thus adjusted it is required to adjust only the directional valve in one direction or the other to obtain a restricted flow in the selected direction; and when it is desired to change over to obtain a full flow in a selected direction of the directional valve, it is only required to adjust the by-pass valve 90° to its H position to cause full volume flow through the unrestricted pair of ports 47 to the motor. The high power position of the by-pass valve for full volume flow is indicated externally of the tool when the pointed end of the finger-grip 42 registers with the H marking on the side of the handle; and the position of the by-pass valve for restricted or regular flow (only when the regulating valve has been retracted) is indicated when the pointed end of the finger-grip 42 registers with the L marking on the face of the handle.

I claim:

1. A pneumatically powered nut running tool comprising in a housing, a reversible rotary air motor for providing a forward or a reverse torque output accordingly as live air is applied to a forward or reverse side of the motor; a throttle valve for admitting live air into the housing; a directional valve selectively manipulative for controlling the directional application of the live air to the motor, and a manually operable flow regulating unit positioned between the directional valve and the throttle valve for regulating the volume flow of the live air from the throttle valve to the directional valve, the regulating unit comprising a manipulative cylindrical hollow by-pass valve closed at one end and open at the other and a separately manipulative regulating valve slidably disposed in the by-pass valve, the by-pass valve and the regulating valve each being selectively adjustable relative to the other for determining either a full or a restricted volume air flow to the directional valve.

2. A pneumatically powered nut running tool as in claim 1, wherein the regulating unit is disposed in a first bore, the directional valve is disposed in a second bore, both of said bores are located in the housing between the throttle valve and the motor, and the first bore is located between the throttle valve and the second bore.

3. A pneumatically powered nut running tool as in claim 2, wherein a first inlet port connects an outlet from the throttle valve with the first bore, a single outlet from the first bore connects with a single inlet to the second bore, and a pair of outlets from the second bore connect the second bore with the motor, a first one of said pair of outlets connecting with the forward side of the motor and a second one of said pair of outlets connecting with the reverse side of the motor.

4. A pneumatically powered nut running tool as in claim 3, wherein the directional valve is selectively angularly adjustable to a first position relative to said single inlet and said pair of outlets in which position the single inlet connects with the first one of said pair of outlets and is blocked off from the second one of said pair of outlets, or to a second position in which the single inlet connects with the second one of said pair of outlets and is blocked off from the first one of said pair of outlets.

5. A pneumatically powered nut running tool as in claim 4, wherein an exhaust port opens from said second bore, and in each of the adjustable positions of the directional valve that outlet of the pair of outlets which is blocked off from the said single inlet is communicated with the exhaust port.

6. A pneumatically powered nut running tool as in claim 5, wherein the directional valve includes a pair of lands joined axially by a neck portion of reduced diameter so as to define an annulus between the lands, one of said lands being a disc having a skewed relation to the neck, the disc having in the first adjustable position of the directional valve a position in which it blocks off the second one of the pair of outlets from the single inlet and communicates the first one of the pair of outlets around the annulus with the single inlet, and the disc having in the second adjustable position of the directional valve a position in which it blocks off the first one of the pair of outlets from the single inlet and communicates the second one of the pair of outlets with the single inlet.

7. A pneumatically powered nut running tool as in claim 6, wherein the disc in either of the adjustable positions of the directional valve communicates with the exhaust port that outlet of the pair which is blocked off from the single inlet.

8. A pneumatically powered nut running tool as in claim 4, wherein the by-pass valve is of cup form having a cylindrical side wall open at one end and provided with a first pair of opposed ports and a second pair of opposed ports arranged rearwardly of the first pair but 90° out of phase from the first pair, the by-pass valve being rotatively adjustable ninety degrees in one direction so as to communicate the inlet port through the first pair of ports with the single inlet to the second bore, and being adjustable ninety degrees in the opposite direction so as to communicate the inlet port through the second pair of ports with the single inlet to the second bore, there being manipulative means extending from a closed end of the by-pass valve externally of one side of the housing for rotatively adjusting the by-pass valve.

9. A pneumatically powered nut running tool as in claim 8, including a stop pin fixed in the housing and extending through a pair of circumferentially extending opposed slots in the side wall of the by-pass valve, the stop pin having cooperation with the sides of the slots to restrain the by-pass valve against axial movement in the first bore and having cooperation with the ends of the slots to limit rotative adjustment of the by-pass valve to a limit of 90° in either direction.

10. A pneumatically powered nut running tool as in claim 9, wherein the regulating valve is received in the by-pass valve for relative axial movement, the regulating valve including a land at a forward end thereof adapted with axial rearward movement of the regulating valve to progressively close over the first pair of ports so as to restrict the openings thereof, and there being manipulative knob means projecting externally of an opposite side of the housing having cooperation with the regulating valve for effecting said axial movement of the latter.

11. A pneumatically powered nut running tool as in claim 10, including a pair of longitudinally extending opposed slots in the land through which said stop pin also extends, the stop pin having cooperation with the ends of the said longitudinally extending slots for limiting the extent of said axial movement of the regulating valve and having cooperation with the sides of the latter slots for restraining the regulating valve against angular movement relative to the by-pass valve.

12. A pneumatically powered nut running tool as in claim 11, wherein the extent of said axial movement of the regulating valve to the by-pass valve in a rearward direction is limited to the axial dimension of the first pair of opposed ports.

13. A pneumatically powered nut running tool as in claim 12, wherein the regulating valve includes a rearwardly extending threaded stem, and the manipulative knob means has an internal threaded connection with the stem and is journaled in the second bore for relative rotation but is restrained against relative axial movement.

14. A regulating unit for regulating live air flow to a pneumatic nut running tool including a housing, the unit comprising a bore in the housing having an inlet and an oppositely disposed outlet; a cylindrical hollow by-pass valve closed at one end and open at the other disposed in the bore for angular adjustment relative to the inlet and outlet, the by-pass valve having a first pair of opposed ports in its side wall and a second pair of similar ports located rearwardly of the first pair but positioned 90° out of phase from the first pair; a manipulative ear projecting from the closed end of the by-pass valve externally of one side of the housing for effecting angular adjustment of the by-pass valve, and means for limiting angular adjustment of the by-pass valve to 90° in either direction, the by-pass valve obtaining upon being adjusted in either direction a position in which one or the other pair of said ports communicates the said inlet and outlet; a regulating valve slidably disposed in the by-pass valve having a cylindrical land at its forward end, manipulative means projecting externally of an opposite side of the housing operatively connected with a rear end of the regulating valve for adjustably moving the latter axially relative to the by-pass valve and causing the land to be drawn into restrictive relation to said first pair of ports, and means for limiting the extent of said axial movement so as to curb the regulating valve from carrying its land into restrictive relation with the second pair of ports.

* * * * *